(12) United States Patent
Sample et al.

(10) Patent No.: US 10,819,151 B2
(45) Date of Patent: Oct. 27, 2020

(54) WIRELESS POWER TRANSMISSION

(71) Applicant: Disney Enterprises, Inc., Burbank, CA (US)

(72) Inventors: Alanson P. Sample, Pittsburgh, PA (US); Matthew J. Chabalko, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 386 days.

(21) Appl. No.: 15/284,050

(22) Filed: Oct. 3, 2016

(65) Prior Publication Data
US 2018/0097402 A1     Apr. 5, 2018

(51) Int. Cl.
*H02J 50/12*   (2016.01)
*H02J 50/40*   (2016.01)
*H02J 50/90*   (2016.01)
*H02J 7/02*    (2016.01)

(52) U.S. Cl.
CPC .............. *H02J 50/12* (2016.02); *H02J 7/025* (2013.01); *H02J 50/40* (2016.02); *H02J 50/90* (2016.02)

(58) Field of Classification Search
CPC .. H02J 50/12; H02J 50/40; H02J 50/90; H02J 7/025; H02J 7/02
USPC ....................................................... 307/104
See application file for complete search history.

(56) References Cited

U.S. PATENT DOCUMENTS

| | | | |
|---|---|---|---|
| 2009/0206987 A1* | 8/2009 | Aubin ................ | G06K 7/10336 340/5.8 |
| 2012/0153734 A1* | 6/2012 | Kurs ..................... | B60L 3/0069 307/104 |
| 2012/0235505 A1* | 9/2012 | Schatz .................... | H02J 50/90 307/104 |
| 2012/0248882 A1* | 10/2012 | Urano .................... | H02J 50/12 307/104 |
| 2012/0306283 A1* | 12/2012 | Kim ....................... | H02J 17/00 307/104 |
| 2012/0326523 A1* | 12/2012 | Fukushima ............. | H02J 5/005 307/104 |
| 2013/0342025 A1* | 12/2013 | Cook ...................... | H02J 5/005 307/104 |
| 2017/0040846 A1* | 2/2017 | Sankar .................... | H02J 50/12 |
| 2017/0141582 A1* | 5/2017 | Adolf ..................... | H02J 5/005 |
| 2018/0083472 A1* | 3/2018 | Menegoli ............... | H02J 50/12 |

* cited by examiner

*Primary Examiner* — Rexford N Barnie
*Assistant Examiner* — Toan T Vu
(74) *Attorney, Agent, or Firm* — Artegis Law Group, LLP

(57) ABSTRACT

One embodiment provides an apparatus for wireless power transmission, comprising: a resonator comprising: a three dimensional structure; and an energy storage mechanism operatively coupled to the three dimensional structure; wherein the three dimensional structure and energy storage mechanism produce standing electromagnetic waves upon driving the resonator. Other systems, methods, apparatuses, and products are described and claimed.

20 Claims, 3 Drawing Sheets

WIRELESS POWER TRANSMISSION

BACKGROUND

Wireless power transfer (WPT) includes wireless techniques for providing power to electrical systems, for example, charging batteries, charging battery powered devices, powering electrical devices, and the like. Known WPT techniques require close proximity between the source providing the electrical power and the device being powered. For example, near-field manetoquasistatic (MQS) WPT and inductive charging are capable of charging a device (e.g., smartphone, tablet, toy, or other device having an electrical circuit) by bringing the device within close proximity to a charging source. Common examples of include charging an electric toothbrush in a charging stand, using a power transfer mat to charge a cell phone, and the like. However, these WPT methods require close receiver to transmitter separation as well as precise receiver orientation to accomplish WPT with high efficiency.

Other WPT methods include far-field techniques which can provide power to receivers over longer distances. For example, broadcast far-field WPT is capable of transferring power at greater distances, e.g., to a radio frequency identification (RFID) tag. However, this broadcast technique is not efficient in that commonly less than 0.1% of the source power is provided to the target device. Additionally, regulations (which vary by jurisdiction) limit the amount of power that can be transferred using such techniques. While point-to-point far-field WPT systems maintain higher end-to-end efficiency, these techniques require complex control and tracking mechanisms to maintain a line of sight connection between the power source and the target and are likewise limited in the amount of power that they can deliver.

BRIEF SUMMARY

In summary, an embodiment provides an apparatus for wireless power transmission, comprising: a resonator comprising: a three dimensional structure; and at least one energy storage mechanism operatively coupled to the three dimensional structure; wherein the three dimensional structure and energy storage mechanism produce standing electromagnetic waves upon driving the resonator.

Another embodiment provides a method for wireless power transmission, comprising: driving a resonator comprising a three dimensional structure and at least one energy storage mechanism to produce standing electromagnetic waves within the three dimensional structure; selecting a resonant frequency for the resonator causing electric fields and magnetic fields of the electromagnetic waves to become substantially uncoupled; and producing, at the selected resonant frequency, an electromagnetic field within the three dimensional structure.

A further embodiment provides a method for wireless power transmission, comprising: driving a resonator that produces an electromagnetic field in a three dimensional structure; tuning at least one receiver to a resonant frequency of the electromagnetic field; and coupling the at least one receiver to the resonator to produce a coupled system, wherein the coupled system transfers electromagnetic energy of the electromagnetic field between the at least one receiver and the resonator.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims.

DETAILED DESCRIPTION

Figure 1:
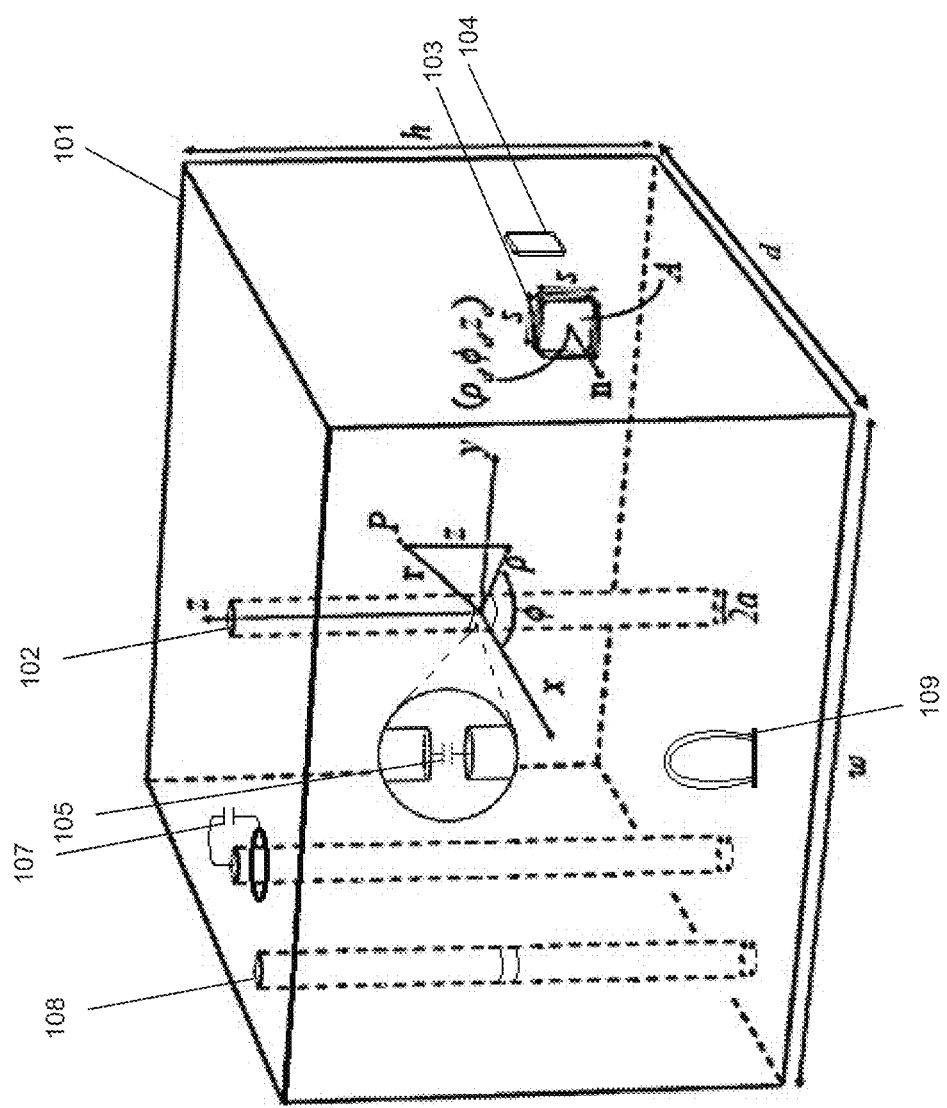
FIG. 1 illustrates an example three dimensional structure and receiver.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

An embodiment provides a technique to wirelessly transmit power within a structure using quasi-static resonance. An embodiment may include a resonator which may include a three dimensional structure and at least one energy storage mechanism coupled to the three dimensional structure. The energy storage mechanism may not be a discrete energy storage mechanism. For example, the energy storage mechanism may include an air gap that functions as a capacitor. The energy storage mechanism may include an energy storage mechanism that stores energy as either electric or magnetic fields. An example energy storage mechanism that stores energy as magnetic fields may include one or more inductors. An example energy storage mechanism that stores energy as electric fields may include one or more capacitors, for example, discrete capacitors, lumped capacitors, non-discrete capacitors, and the like. In one embodiment the one or more capacitors may be coupled to a metallic structure, for example, a pole, plate, column, or the like. In the context of this disclosure, the metallic structure to which the capacitors are coupled will be referred to a pole. However, it should be understood that the metallic portion may be of any shape or size. The energy storage mechanism may also include a combination of capacitors and inductors. In other words, any type of energy storage medium may be used.

In one embodiment, upon driving the resonator, standing electromagnetic waves may be produced within the three dimensional structure. In one embodiment, driving the resonator may include injecting or pumping magnetic fields into the resonator using an external coil. In an alternative embodiment, driving the resonator may include driving current or voltage into the energy storage mechanism or the three dimensional structure. Once the electromagnetic field has been produced, at least one receiver may be tuned to the resonant frequency of the electromagnetic field. Once the receiver has been tuned, the receiver may be coupled to the resonator to produce a coupled system. Within this coupled system, electromagnetic energy may be transferred between the two objects. The electromagnetic energy may then be used to provide power to an object connected to the receiver.

The frequency of operation of such that the free space wavelength is much larger than the size of the resonator, thereby operating in a deeply subwavelength regime. Thus, in an embodiment, the electric field of the energy storage mechanism and the magnetic field of the structure may be largely decoupled, with the most intense electric fields being predominantly confined to the area around the energy storage mechanism. The magnetic field, however, may fill the structure and may then be used to transfer power to a device within the structure using a receiver.

An embodiment can provide wireless power transmission to multiple receivers within the structure. Each of the receivers may be coupled to a device having an electrical circuit, which may be powered using the power transmitted via the magnetic field. Due to the fact that the magnetic field may be directional, the receiver may need to be aligned with the direction of the magnetic field. Therefore, in one embodiment, a device may have multiple receivers along differing axes to ensure that power can be received regardless of the orientation of the device.

The illustrated example embodiments will be best understood by reference to the figures. The following description is intended only by way of example, and simply illustrates certain example embodiments.

Referring to FIG. 1, an example of a quasistatic cavity resonator with a receiver is illustrated. FIG. 1 illustrates a diagram of an example cavity resonator in the form of a three-dimensional structure 101. The structure 101, as shown in FIG. 1, is shown as a rectangular box, having a given height (h), depth (d), and width (w). However, the techniques as described herein can be applied to other arbitrary shapes. In one embodiment the structure 101 may be substantially enclosed, for example, as a room having a door, as an enclosure with a single opening, a toy box having a lid, and the like. Alternatively, because the system works in a deep sub-wavelength operation, the structure 101 may have multiple openings, for example, a room having multiple doorways and windows, an enclosure with multiple openings, a pass-through, and the like. In other words, the structure 101 does not have to be fully enclosed and can have many gaps. For example, the structure 101 may not have a ceiling and would still be functional using the techniques as described herein.

The structure 101 may be a metallic structure or constructed of any other type of conductive material. However, the entire structure does not have to be conductive, nor, as discussed above, do the conductive parts have to be solid sheets. For example, the structure may be constructed using a conductive mesh or multiple different conductive materials. The structure 101, however, should include a conductive path between parts of the structure and the energy storage mechanism. Additionally, objects within the structure, including both non-resonant and conductive or metallic objects, do not affect the operation of the system. Therefore, the structure may include normal functioning everyday rooms, for example, offices, living rooms, auditoriums, and the like.

In FIG. 1, an energy storage mechanism 102 is shown as a group of capacitors, represented by capacitor symbol 105, coupled to a pole which is located between the floor and ceiling of the structure 101. The electric fields may be substantially contained to the energy storage mechanism. Illustratively, more than one energy storage mechanism 102, 107, and 108 may be included at different locations within the structure 101. For example, in a large space, more than one energy storage mechanism may be included in different locations to maintain a desirable magnetic field levels. Additionally, a single energy storage mechanism 102 may result in a magnetic field having a particular directionality. The directionality of the magnetic field may be controlled by controlling the phase offset of the energy storage mechanism 102. Accordingly, in one embodiment multiple energy storage mechanisms may be included in a single structure, each being driven using a different phase offset. Such a system would result in more than one magnetic field having different field directions.

In one embodiment, and as shown in the example of FIG. 1, the energy storage mechanism 102 may include at least one capacitor 105 which may be coupled to a metallic pole, or other suitably conductive object. Like the three dimensional structure, the conductive structure does not have to be a complete structure. In other words, the conductive structure may include air gaps. The pole coupled to the energy storage mechanism 102, as shown in FIG. 1, has a given diameter (2a). The capacitors may include discrete capacitors, non-discrete capacitors, lumped capacitors, or the like. Also, the capacitors provide for energy storage in an electric field. However, other energy storage devices (e.g., inductors, etc.) may be used in place of the capacitors and may store energy in different fields, for example, magnetic fields. For ease of understanding, the energy storage mechanism of the capacitors will be used as an example. However, as explained and discussed before, this is a non-limiting example. The capacitors may be coupled to a metallic pole. For example, the capacitors may be formed as a ring around the pole and electrically connected to the pole. As another example, the capacitors may be inserted into the pole. The capacitors may also be located away from the pole and electrically connected to the pole. Thus, the capacitors may be located at any location with respect to the pole and need not be attached at a specific point on the pole (e.g., at a central location of the pole, at the top of the pole, at the bottom of the pole, etc.).

The energy storage mechanism 102, may be placed anywhere within the energy path of the resonator 101. The energy storage mechanism 102 may be electrically connected to opposing sides of the structure 101. For example, as shown in FIG. 1, the metallic pole coupled to the energy storage mechanism 102 may be vertically stationed and connected between the floor and the ceiling of the three-dimensional structure 101. As another example, the metallic pole coupled to the energy storage mechanism 102 may be horizontally stationed between two walls of the structure 101. In one embodiment, and as shown in FIG. 1, the energy storage mechanism 102 may be placed within the three-dimensional structure 101. However, either all or a portion of the energy storage mechanism 102 may be placed outside the three-dimensional structure. For example, the pole coupled to the energy storage mechanism 102 may be affixed above the ceiling of the structure 101 and electrically connected to the structure 101. In one embodiment a portion of the energy storage mechanism 102 may be within the three dimensional structure 101, while another portion of the energy storage mechanism 102 is located outside the structure 101. For example, the metallic pole coupled to the energy storage mechanism 107 is placed within the structure 101 and the capacitor portion of the energy storage mechanism 107 is outside the structure 101 and coupled to the metallic pole.

The electric fields are generally contained nearest to the capacitors. The system may include sensors or other devices that are used to measure the electric fields. Additionally, the sensors may be used to indicate safe electric field levels in the vicinity of the resonator. Other sensors may be incorporated to monitor the location of a people, animals, and other objects, with respect to the electric field.

In FIG. 1 a receiver 103 is shown. The receiver 103 has given length(s)(S) and a unit normal of the surface (n). The receiver 103 may be a coil (single loop) receiver, as shown in FIG. 1, and as also used in the example implementations. However, the receiver 103 may also be a dipole antenna, multi-turn coil, or other type of receiver that can capture the flux produced by the magnetic fields of the quasistatic cavity resonator or electric fields. Receivers which capture magnetic flux may include closed loop receivers, while receivers which capture electric fields may include antennas. In other words, both magnetic field coupling and electric field coupling may be used to transfer power to the receiver. The receiver 103 may be connected to a device having an electrical system (e.g., fan, tablet, cellular phone, toy, television, electronic device, etc.). The receiver 103 may be electrically coupled to the electrical system of the device in order to transfer power to the device, for example, powering the device, recharging the battery of the device, and the like. Due to the direction of the magnetic fields within the structure 101 a single receiver coil may be required to be aligned with the direction of the magnetic field, which may correspond to the radial axis of the pole in order to receive wireless power. Therefore, in one embodiment, a device may include more than one receiver, where each of the receivers on the device may be oriented along different planes. For example, the device may include three orthogonal receive coils in a single device, two of which are shown for illustrative purposes as the receivers 103 and 104.

Figure 2:
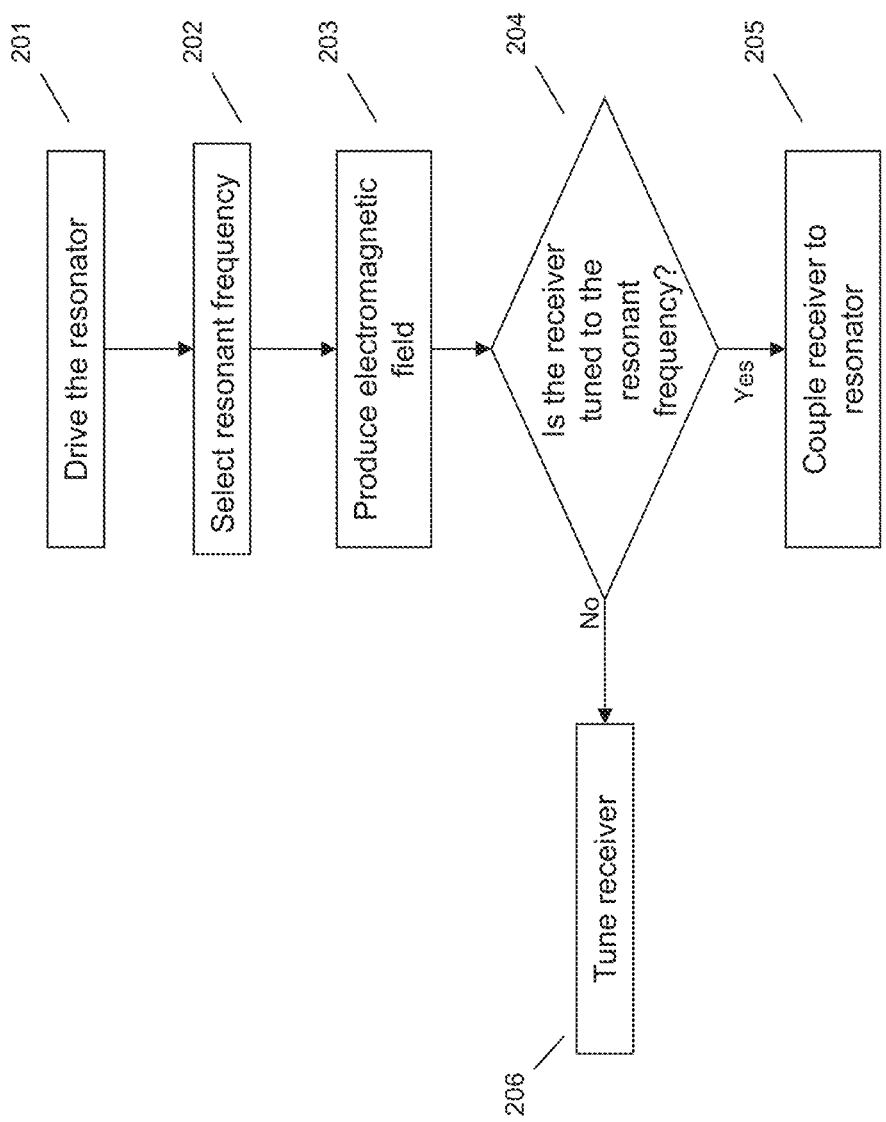
FIG. 2 illustrates an example method of wireless power transmission.

Referring to FIG. 2, an embodiment may drive a resonator to produce standing electromagnetic waves within a three dimensional structure. The resonator may include a three dimensional structure and at least one energy storage mechanism. The resonator may include a quasi-static cavity resonator. However, the resonator can support multiple quasistatic modes and even non-quasistatic modes. In one embodiment, driving the resonator may include injecting magnetic fields into the three dimensional structure. Injecting magnetic fields may include using an external coil, such as the coil 109 shown in FIG. 1. In another embodiment, driving the resonator may include driving current (or voltage) into the energy storage mechanism. In other words, the structure may be driven, the energy storage mechanism may be driven, and the like. For example, a signal generator and radio frequency (RF) amplifier may be used to drive the resonator, for example, by generating a near-field standing wave.

At 202 an embodiment may select a resonant frequency for the resonator which causes the electric fields and the magnetic fields of the electromagnetic fields to become substantially uncoupled. In one embodiment the resonant frequency may result in a quasistatic resonance, which means that the resonance will remain uniform and constant throughout the entire structure. The resonance occurs when the energy is transferring between the magnetic fields stored in the structure and the electric fields stored in the capacitors. Multiple input frequencies may be used, for example, the input frequencies may be switched between frequencies, multiple devices may supply different input frequencies, and the like. The capacitance that needs to be included with the energy storage mechanism to produce resonance at a given frequency may be computed from known expressions for calculating resonance. At the selected resonant frequency or frequencies, an electromagnetic field may be produced at 203.

To transfer power from the produced electromagnetic field and a receiver, an embodiment may determine if the receiver is tuned to the resonant frequency at 204. The receiver or resonator may implement impedance tuning to optimize the power transfer. If the receiver is not tuned at least one of the resonant frequencies, an embodiment may tune the receiver at 206. If, however, the receiver is tuned to the resonant frequency, the receiver may couple to the resonator to produce a coupled system at 205. Within this coupled system electromagnetic energy is transferred between the at least one receiver and the resonator. Power can be extracted from the magnetic fields by a resonant receiver which has been tuned to the same resonant frequency as the cavity. The system may include multiple receivers. The coupling of the receiver may include a direct coupling of the receiver to the energy storage mechanism. Alternatively, the receiver may include a coupling coil which is used to couple to the resonator.

The receiver may also include a mechanism to track the frequency of the resonator. Thus, if the frequency of the resonator changes, the receiver can retune itself to match the new resonant frequency. Additionally, the receiver may use a similar retuning technique to detune itself from the resonant frequency. The detuning results in the receiver uncoupling from the resonator and stopping the transfer of electromagnetic energy between the receiver and the resonator. Thus, the receiver may stop charging or providing power to the coupled device. Tuning the receiver may include adjusting a tuning capacitor, or otherwise adjusting the capacitance of the receiver.

To identify the coupling coefficient between the cavity resonator and the receiver(s), the magnetic and electric field distributions need to be identified. The electromagnetic fields due to a current source can be derived by finding the magnetic vector potential. The magnetic vector potential in steady state due to a current distribution may be in part based upon the permeability of free space, the vector (r in FIG. 1) from the origin to the field observation point (P in FIG. 1), and the wavenumber at a given excitation frequency. The magnetic field can then be obtained using the relationship between the magnetic vector potential and magnetic fields. The electric field can then be identified using Ampere's law in Maxwell's equations.

The magnetic and electric fields of the energy storage mechanism may be identified first. The magnetic and electric fields of the walls, and effect of these fields on the energy storage mechanism fields, may then be taken into account to accurately identify the coupling coefficient, the wireless power transfer efficiency, and the value of the electric field with regard to operational limits when transferring electric and magnetic fields within the structure. The total electric or magnetic field within the cavity is simply the electric or magnetic field as produced by the energy storage mechanism plus the sum of the electric or magnetic field due to the presence of the conducting walls of the structure.

The coupling coefficient can be calculated given an equation representing coupled resonators' amplitude evolution over time. An example measurement of deriving this equation is described. Two coupled resonators (here structure/energy storage mechanism (101/102) and receiver 103) have resonant symmetric and anti-symmetric modes that occur at two different frequencies, and this difference in these frequencies has a determined relationship. Thus, by measuring the resonant frequencies of the modes of a full system (here structure/energy storage mechanism (101/102) and receiver 103) using a Vector Network Analyzer (VNA), the coupling coefficient may be determined. By way of example, a receiver may be placed within a structure and moved to different locations within the structure. At each location, a measurement may be taken with the VNA. Using measured values for the quality factor (Q-factor) of the structure 101 and receiver 103, the intrinsic loss rates of the structure 101 and receiver 103 may be evaluated. In order to determine the Q-factors of the receiver 103 and structure 101, the VNA is used to record measurements of each component. Then, standard microwave resonator measurement techniques are used to extract system parameters. Thus, using the measured magnitude of the difference of the resonant symmetric and anti-symmetric modes, the coupling coefficient may be determined given an equation representing the coupled resonators' amplitude evolution over time.

Figure 3:
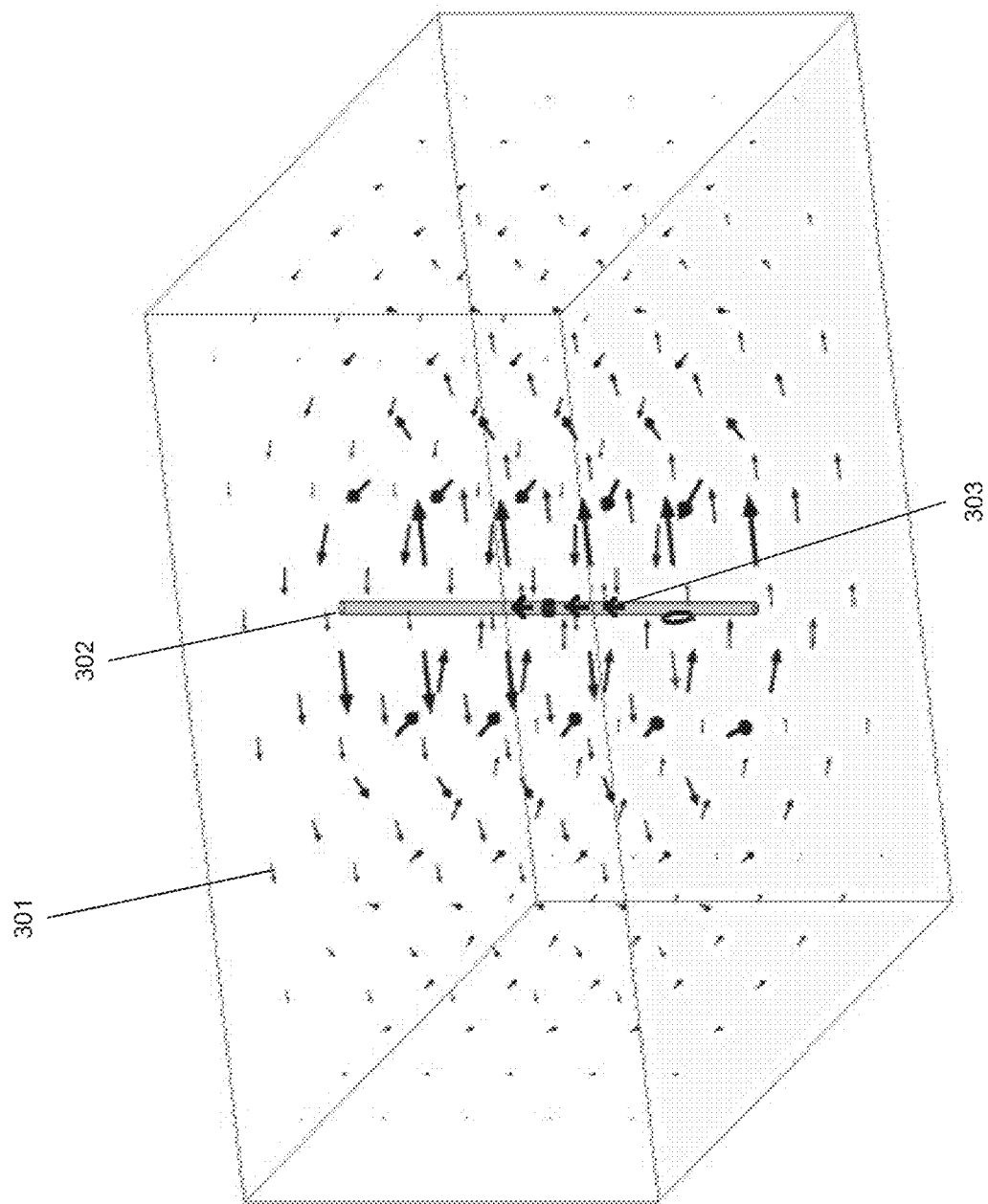
FIG. 3 illustrates an example three dimensional structure and magnetic field.

The electric field is largely decoupled from the magnetic field. In one embodiment, the most intense electric fields are confined to the energy storage mechanism. As shown in FIG. 3, the structure's magnetic field 301, as shown by arrows, oscillates around the energy storage mechanism 302. The magnetic fields arise from time alternating currents (A/C) which are driven up/down the walls, through the ceiling and floor, and into the capacitor on the pole. As shown, the A/C currents include the current 303 which is driven up/down into the capicator on the pole 302. The field distribution is constant as a function of height, and objects within the structure do not affect the magnetic field.

Various aspects may be embodied as a system, method or device. Accordingly, aspects may take the form of an entirely hardware embodiment or an embodiment including software that may all generally be referred to herein as a "circuit," or "system."

While specific blocks are used in the figures, and a particular ordering of blocks and elements has been illustrated, these are non-limiting examples. In certain contexts, two or more blocks or elements may be combined, a block or element may be split into two or more blocks or elements, or certain blocks or elements may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise. In the context of this document, a non-signal storage device is not a signal, is non-transitory, and "non-transitory" includes all media except signal media.

This disclosure has been presented for purposes of illustration and description but is not intended to be exhaustive or limiting. The example embodiments were chosen and described in order to explain principles and practical application, and to enable others to understand the disclosure for various embodiments with various modifications as are suited to the particular use contemplated.

Thus, although illustrative example embodiments have been described herein with reference to the accompanying figures, this description is not limiting and that various other changes and modifications may be affected therein without departing from the scope or spirit of the disclosure.

What is claimed is:

1. A system for wireless power transmission, comprising:
    a cavity resonator comprising:
        a three dimensional structure, wherein the three dimensional structure comprises a room, and at least a portion of the three dimensional structure comprises a conductive material, and
        at least one energy storage mechanism operatively coupled to the three dimensional structure via a conductive object,
        wherein the cavity resonator is driven at a frequency associated with a free space wavelength that is larger than the three dimensional structure, and wherein energy transfers between a magnetic field that resides within the three dimensional structure and an electric field that is substantially confined to the at least one energy storage mechanism.

2. The system of claim 1, further comprising a coil distinct from the cavity resonator, wherein the coil injects one or more magnetic fields into the cavity resonator.

3. The system of claim 1, wherein the energy storage mechanism comprises at least one capacitor.

4. The system of claim 3, wherein the driving the cavity resonator comprises driving current into the at least one capacitor.

5. The system of claim 3, wherein the at least one capacitor is coupled to the conductive object.

6. The system of claim 3, wherein the at least one capacitor comprises a plurality of lumped capacitors.

7. The system of claim 1, wherein the energy storage mechanism is located outside the three dimensional structure.

8. The system of claim 1, wherein the cavity resonator comprises a quasi-static cavity resonator.

9. The system of claim 1, wherein the at least one energy storage mechanism comprises more than one energy storage mechanism, and wherein each of the energy storage mechanisms are located at different locations within the three dimensional structure.

10. The system of claim 1, wherein the three dimensional structure comprises a substantially metallic structure.

11. A method for wireless power transmission, comprising:
    selecting a resonant frequency associated with a free space wavelength that is larger than a three dimensional structure, wherein the three dimensional structure comprises a room, and at least a portion of the three dimensional structure comprises a conductive material; and
    driving, at the resonant frequency, a cavity resonator comprising the three dimensional structure and at least one energy storage mechanism to produce standing electromagnetic waves within the three dimensional structure, wherein the at least one energy storage mechanism is operatively coupled to the three dimensional structure via a conductive object, and wherein, in response to the driving, energy transfers between a magnetic field that resides within the three dimensional structure and an electric field that is substantially confined to the at least one energy storage mechanism.

12. The method of claim 11, wherein the driving the cavity resonator comprises injecting, using a coil, one or more magnetic fields into the three dimensional structure.

13. The method of claim 11, wherein the driving the cavity resonator comprises driving current into the at least one energy storage mechanism.

14. The method of claim 11, wherein the electric field and the magnetic field are substantially uncoupled.

15. The method of claim 11, wherein the at least one energy storage mechanism comprises a plurality of energy storage mechanisms, and wherein each of the energy storage mechanisms is located at a distinct location within the three dimensional structure.

16. The method of claim 11, further comprising controlling a direction of the magnetic field by driving the cavity resonator with a predetermined phase offset.

17. A method for wireless power transmission, comprising:

driving a cavity resonator that produces an electromagnetic field in a three dimensional structure operatively coupled to at least one energy storage mechanism via a conductive object, wherein the three dimensional structure comprises a room, and at least a portion of the three dimensional structure comprises a conductive material, wherein the cavity resonator is driven at a resonant frequency associated with a free space wavelength that is larger than the three dimensional structure, and wherein energy transfers between a magnetic field that resides within the three dimensional structure and an electric field that is substantially confined to the at least one energy storage mechanism;

tuning at least one receiver to the resonant frequency; and coupling the at least one receiver to the cavity resonator to produce a coupled system, wherein the coupled system transfers electromagnetic energy of the electromagnetic field between the cavity resonator and the at least one receiver.

18. The method of claim 17, further comprising the at least one receiver detuning from the resonant frequency and decoupling from the cavity resonator to stop electromagnetic energy transfer to the at least one receiver.

19. The method of claim 17, wherein the receiver comprises a coupling coil.

20. The method of claim 17, wherein the tuning at least one receiver comprises tuning more than one receiver.

* * * * *